United States Patent [19]
Vogel et al.

[11] Patent Number: 6,018,294
[45] Date of Patent: *Jan. 25, 2000

[54] AUTOMATIC TRANSMISSION SHIFT INDICATOR SYSTEM

[75] Inventors: Mark S. Vogel, Detriot; James Spiker, Livonia; Stephen Greene, Ann Arbor, all of Mich.

[73] Assignee: Chrysler Corporation, Auburn Hills, Mich.

[*] Notice: This patent issued on a continued prosecution application filed under 37 CFR 1.53(d), and is subject to the twenty year patent term provisions of 35 U.S.C. 154(a)(2).

[21] Appl. No.: 09/080,745

[22] Filed: May 18, 1998

[51] Int. Cl.[7] .............................. B60Q 1/00; B60Q 1/26
[52] U.S. Cl. ..................... 340/456; 340/468; 340/686.1
[58] Field of Search .................. 340/456, 686.1, 340/463, 468; 200/61.88, 61.91, 61.37; 74/473.21, 473.27, 527; 477/148, 149

[56] References Cited

U.S. PATENT DOCUMENTS

| | | | |
|---|---|---|---|
| 3,423,549 | 1/1969 | Sondej | 200/61.88 |
| 3,966,254 | 6/1976 | Guhl et al. | 298/22 C |
| 4,031,977 | 6/1977 | Grosseau | 180/336 |
| 4,037,196 | 7/1977 | Atkinson et al. | 340/456 |
| 4,038,889 | 8/1977 | Lindow et al. | 477/148 |
| 4,155,068 | 5/1979 | Zajichek | 340/456 |
| 4,158,833 | 6/1979 | Chicoine | 340/468 |
| 4,550,675 | 11/1985 | Lansinger et al. | 116/28.1 |
| 4,882,572 | 11/1989 | Lippmann et al. | 340/456 |
| 4,970,493 | 11/1990 | Yim | 340/468 |
| 5,009,128 | 4/1991 | Seidel et al. | 340/456 |
| 5,064,975 | 11/1991 | Boucher | 200/61.88 |
| 5,090,269 | 2/1992 | Ohtsuka et al. | 74/861 |
| 5,161,422 | 11/1992 | Suman et al. | 340/456 |
| 5,231,254 | 7/1993 | Baker et al. | 200/61.91 |
| 5,325,083 | 6/1994 | Nassar et al. | 340/456 |
| 5,420,565 | 5/1995 | Holbrook | 340/456 |
| 5,453,732 | 9/1995 | Takano | 340/450 |
| 5,561,416 | 10/1996 | Marshall et al. | 340/456 |
| 5,696,483 | 12/1997 | Khalid et al. | 340/456 |

*Primary Examiner*—Jeffery A. Hofsass
*Assistant Examiner*—Van T. Trieu
*Attorney, Agent, or Firm*—Roland A. Fuller, III

[57] ABSTRACT

An automatic transmission shift indicator system is provided to electrically indicate the selected gear of an automatic transmission in a motor vehicle. The shift indicator system includes a gear selector, transmission locking plate, a switch and a visual shift indicator. The gear selector connects to a locking plate in the transmission and is manually operative by the vehicle's driver to rotate the locking plate within a range of positions that correlate to each of the selectable transmission gears. The park neutral safety switch is modified to movably engage a stepped cam surface of the locking plate, so that each step corresponds to one of the selectable transmission gears. As the gear selector is shifted from gear to gear, the switch is actuated and thus transmits an electrical signal that is indicative of a selected transmission gear. The visual shift indicator decodes the selected transmission gear based on the resistance value of the electrical signal and displays the selected gear to the driver.

9 Claims, 3 Drawing Sheets

AUTOMATIC TRANSMISSION SHIFT INDICATOR SYSTEM

BACKGROUND OF THE INVENTION

1. Field of the Invention

The present invention relates generally to a shift indicator system for an automatic transmission of a motor vehicle and, more particularly, to a shift indicator system that has been integrated with a park neutral safety switch in the transmission of the vehicle.

2. Discussion

Shift indicator systems for indicating the selected gear of a transmission in motor vehicles are generally known in the automotive industry. A vehicle's driver manually operates a gear selector lever to select a desired transmission gear. Typically, the gear selector lever is mechanically connected to a shift indicator mechanism for displaying the selected gear to the driver. However, the shift indicator may also electrically determine the selected gear. These electrical shift indicator systems utilize complex circuitry and require additional components to implement within the vehicle.

Therefore, it would be desirable to provide an improved shift indicator system for electrically determining a selected gear of an automatic transmission. This shift system should be integrated into existing vehicle components to reduce the number of components, thereby reducing the cost and complexity of today's motor vehicles. By resistive multiplexing the functions in a park neutral safety switch, the number of circuits as well as packaging size of the shift indicator system can be reduced.

SUMMARY OF THE INVENTION

In accordance with the teachings of the present invention, a shift indicator system is provided for electrically indicating the selected gear of an automatic transmission in a motor vehicle. The shift indicator system includes a gear selector, transmission locking plate, a switch and a visual shift indicator. The gear selector connects to a locking plate in the transmission and is manually operative by the vehicle's driver to rotate the locking plate within a range of positions that correlate to each of the selectable transmission gears. The switch movably engages a stepped cam surface of the locking plate member. Each step of this cam surface corresponds to one of the selectable transmission gears. As the gear selector is shifted from gear to gear, the switch is actuated and thus transmits an electrical signal that is indicative of a selected transmission gear. The visual shift indicator decodes the selected transmission gear based on the resistance value of the electrical signal and displays the selected gear to the driver.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
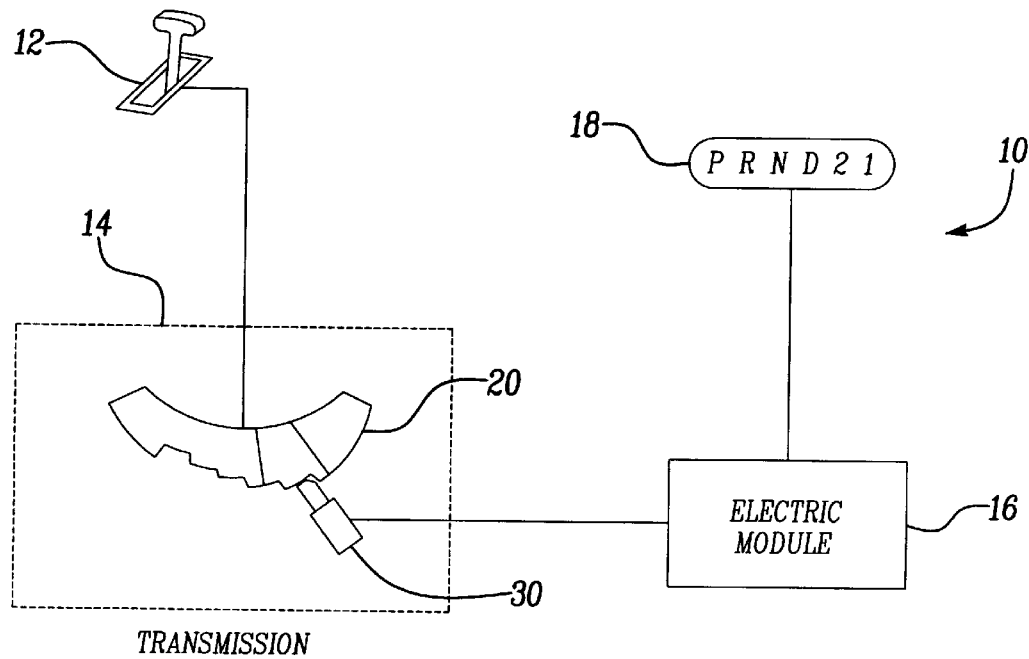
FIG. 1 is a block diagram showing the components of the shift indicator system of the present invention.

A shift indicator system 10 for electrically indicating a selected gear of an automatic transmission 14 in a motor vehicle is illustrated in FIG. 1. Shift indicator system 10 includes a transmission gear selector 12, a transmission locking plate 20, a switch 30, and a shift indicator 18. Optionally, an electronic module 16 electrically interconnects between switch 30 and shift indicator 18.

Transmission gear selector 12 is accessible to the vehicle's driver and mechanically couples via a cable or other connector means to the locking plate 20 in the vehicle's transmission 14. Switch 30 is positioned in transmission 14 so that it movably engages locking plate 20 as well as electrically connects to the shift indicator 18. Shift indicator 18 visually indicates the selected gear position (i.e. park, reverse, neutral, drive, low drive 1, low drive 2, ect.) of transmission 14 to the driver and is generally located near gear selector 12. As will be apparent to one skilled in the art, shift indicator 18 can also be positioned remotely from gear selector 12 in an instrument cluster visible to the driver.

Figure 2:
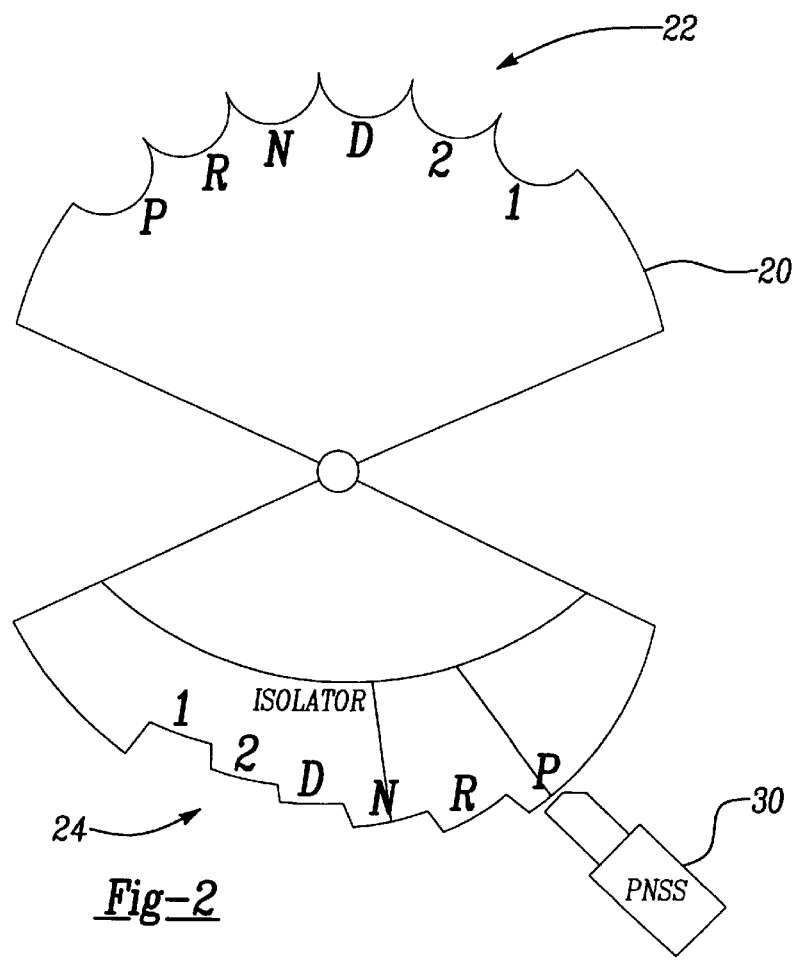
FIG. 2 is a diagram illustrating a park neutral safety switch interfacing with a transmission locking plate in the shift indicator system of the present invention.

In operation, the driver selects a desired gear using transmission gear selector 12. Manual operation of gear selector 12 causes locking plate 20 to rotate within a range of selectable transmission gears which in turn actuates switch 30. As best seen in FIG. 2, locking plate 20 will be "stepped" to allow the switch 30 to reach deeper into locking plate 20 as gear selector 12 is shifted from gear to gear.

Locking plate 20 comprises an "hour glass" shaped steel part (also referred to as a rooster comb) that is used to "lock" the transmission 14 into gear with a ball and socket type of approach. A plurality of sockets 22 are formed along a surface of locking plate 20 for engaging a detent (not shown). Each of the sockets 22 correlate to a selectable transmission gear. Therefore, as gear selector 12 is shifted from gear to gear, locking plate 20 provides the feel to the driver that the transmission is in gear.

On the opposite side of locking plate 20 (also called an isolator) is a "stepped" cam surface 24 that interfaces with switch 30. As currently implemented, the isolator provides the mechanism that activates the reverse lamp as well as two metal leads that ground the starter solenoid when the gear selector is in park and neutral. In the present invention, "stepped" cam surface 24 is a plastic piece of locking plate 20 that includes a step for each of the selectable transmission gears. As the gear selector 12 is shifted from gear to gear, locking plate 20 rotates and switch 30 is actuated a distance equivalent to the depth of each step. In other words, the distance between steps on cam surface 24 correlates the distance the driver actuates gear selector 12 when selecting another gear.

Figure 3:
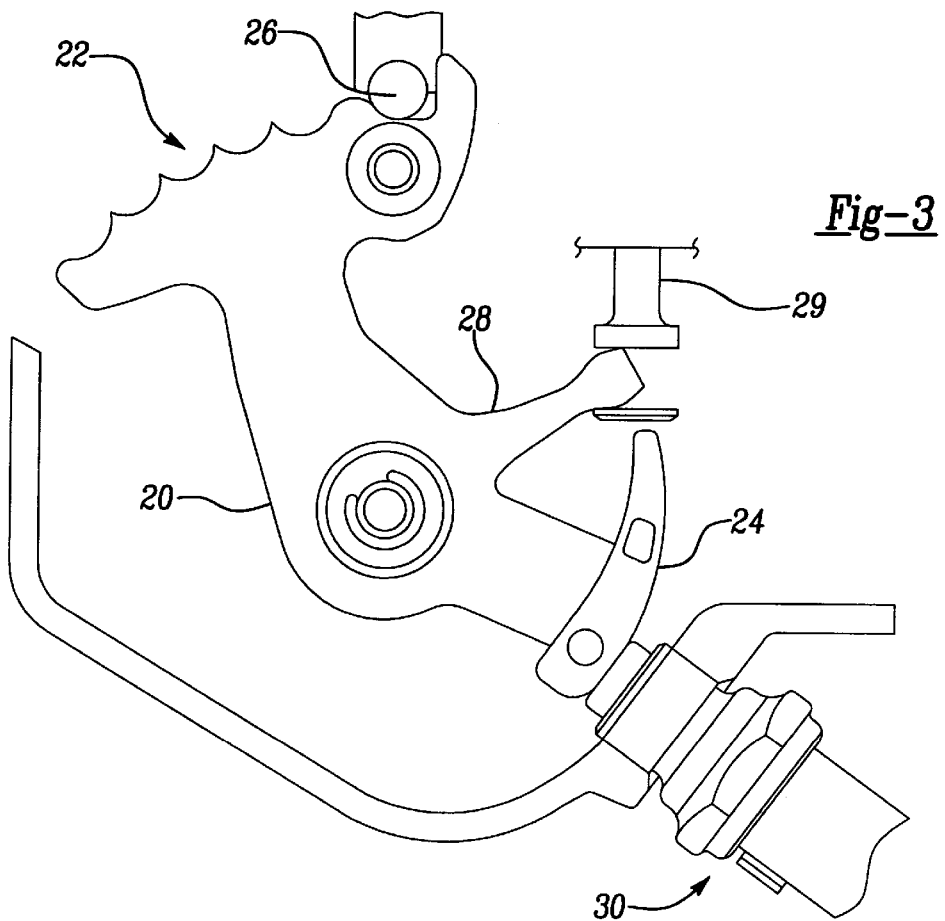
FIG. 3 is a fragmentary perspective view showing a preferred embodiment of the locking plate in the shift indicator system of the present invention.

In FIG. 3, a preferred embodiment of locking plate 20 is shown for use in shift indicator system 10 of the present invention. One of the sockets 22 engages a detent 26 to lock the transmission in gear; whereas the cam surface 24 of locking plate 20 interfaces with switch 30. In addition, locking plate 20 further includes an extending finger 28 which operatively connects to a drive ratio selector valve 29 that is adapted to control the hydraulic system of the transmission.

As currently produced, a vehicle's park neutral safety switch is inserted in the transmission and provides a ground path for the starter solenoid as well as completes the circuit for the reverse lamps. In the present invention, the switch 30 interfaces with shift indicator 18 as well as the starter solenoid and the reverse lamps. As it relates to shift indicator 18, switch 30 uses potentiometric output to resistive multiplex the signal, such that each change in gear position results in electrical contact through a different resistor. By resistive multiplexing the functions of the switch 30 and varying a transmitted electrical signal based on the depth of its insertion, switch 30 transmits an electrical signal that is indicative of the selected transmission gear.

Upon receiving an electrical signal from switch 30, an electronic module 16 will decode the signal and determine which gear position should be illuminated in shift indicator 18. Electronic module 16 may use a ten bit analog to digital converter to decode the electrical signal into a selected gear position. Although the signal can be decoded directly by shift indicator 18 for display, an intervening electronic module (such as the engine controller, the instrument control module, or the transmission controller) may decode the signal sent by switch 30 and thus transmit a second electrical signal to shift indicator 18. Shift indicator 18 may be remotely located from and interconnected via a communication bus to this electronic module. In either case, visual shift indicator 18 illuminates the selected gear position of the transmission to the driver.

Figure 5:
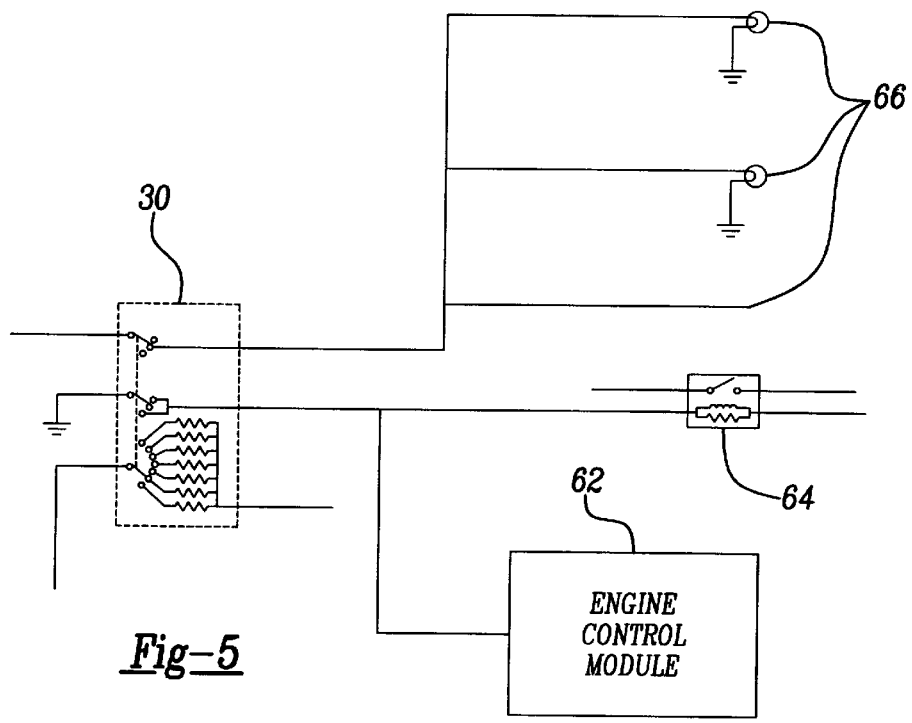
FIG. 5 is a schematic showing a preferred embodiment of the switch being integrated into the vehicle's existing electrical systems.
Figure 4:
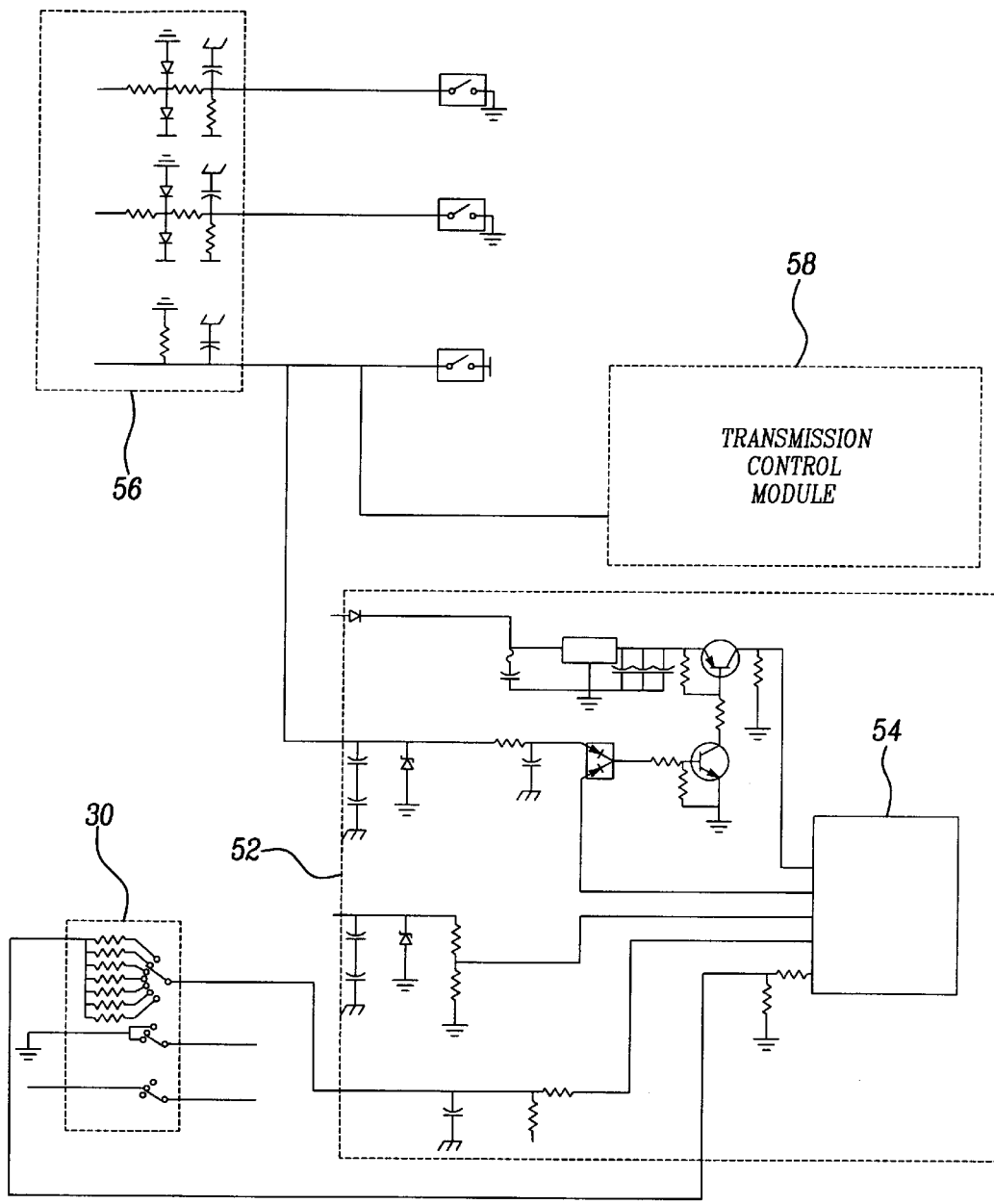
FIG. 4 is a schematic showing a preferred embodiment of the switch being integrated into the vehicle's existing electrical systems.

FIGS. 4 and 5 are schematics that illustrate the modified park neutral safety switch 30 being integrated with a vehicle's electrical systems. Switch 30 uses a triple pole mechanism for interfacing with instrument control module 54, starter solenoid 64 and rear backup lights 66. In FIG. 4, each of the different resistive circuit paths of switch 30 are tied into a first output terminal 32 for transmitting an electrical signal indicative of the selected gear to an instrument control module 54. Instrument control module 54 is associated with the circuitry of an instrument cluster 52. More specifically, instrument control module 54 decodes the electrical signal transmitted from switch 30 and electrically connects to the visual shift indicator. In addition, instrument control module 54 electrically connects to a central timer module 56 and a transmission control module 58.

As best seen in FIG. 5, a second output terminal 34 provides a ground path for electrically activating starter solenoid 64 when switch 30 is actuated to a neutral or park gear position; whereas switch 30 provides a complete circuit path through a third output terminal 36 to illuminate rear backup lights during a reverse gear position. It is also envisioned that switch 30 may interface with other vehicle safety devices in a similar manner.

While the above description constitutes the preferred embodiment of the invention, it will be appreciated that the invention is susceptible to modification, variation, and change without departing from the proper scope or fair meaning of the accompanying claims.

We claim:

1. A shift indicator system for electrically indicating the selected gear of an automatic transmission in a motor vehicle, comprising:

a gear selector connects to a plate member in the transmission, said gear selector manually operative to rotate said plate member within a range of selectable transmission gears;

a switch movably engages a stepped cam surface of said plate member, such that each step of said cam surface correlates to one of said selectable transmission gears, and transmits an electrical signal being indicative of one of said selectable transmission gears, where said switch encodes said electrical signal using resistive multiplexing to indicate one of said selectable transmission gears;

a shift indicator electrically connects to said switch for displaying the selected transmission gear based on said electrical signal; and a vehicle safety device electrically connects to said switch, said switch being operative to activate said vehicle safety device for a first selected transmission gear.

2. The shift indicator system of claim 1 wherein said vehicle safety device is further defined as a rear backup light, said rear backup light being activated when said first selected transmission gear is a reverse gear.

3. The shift indicator system of claim 1 wherein said vehicle safety device is further defined as a starter solenoid, said starter solenoid being activated when said first selected transmission gear is at least one of a park gear and a neutral gear.

4. The shift indicator system of claim 1 wherein said plate member having a plurality of sockets defined therein for engaging a detent, such that each of said sockets correlate to a selectable transmission gears, whereby said transmission gear selector locks into position for each of said selectable transmission gears.

5. The shift indicator system of claim 1 further comprising an electronic module electrically interconnects between said switch and said shift indicator for decoding said electrical signal and transmitting a second electrical signal indicative of the selected gear to said shift indicator.

6. The shift indicator system of claim 5 wherein said electronic module is further defined as at least one of an engine control module, a transmission control module and instrument control module.

7. An shift indicator system for electrically indicating the selected gear of an automatic transmission in a motor vehicle, comprising:

a gear selector mechanically connects to a plate member in the transmission, said gear selector manually operative to rotate said plate member within a range of selectable transmission gears;

a switch having a plurality of resistive circuit paths and movably engaging a stepped cam surface of said plate member, such that rotational movement of said plate member actuates said switch between said plurality of resistive circuit paths, said switch transmitting an electrical signal indicative of one of said selectable transmission gears based on actuation of said switch by said plate member;

an electronic module electrically connects to said switch for decoding said electrical signal and generating a second electrical signal indicative of the selected gear; and a visual shift indicator electrically connects to said electronic module for displaying the selected gear based on said second electrical signal;

a rear backup light electrically connects to said switch, said rear backup light being activated when the selected transmission gear is a reverse gear; and a starter solenoid electrically connects to said switch, said starter solenoid being activated when the selected transmission gear is at least one of a park gear and a neutral gear.

8. The automatic transmission shift indicator system of claim 7 wherein said plate member having a plurality of sockets defined therein for engaging a detent, such that each of said sockets correlate to a selectable transmission gears, whereby said transmission gear selector locks into position for each of said selectable transmission gears.

9. The automatic transmission shift indicator system of claim 7 wherein said electronic module is further defined as at least one of an engine control module, a transmission control module and instrument control module.

* * * * *